US011140607B2

(12) United States Patent
Gholmieh et al.

(10) Patent No.: US 11,140,607 B2
(45) Date of Patent: Oct. 5, 2021

(54) COMMUNICATION LINK SELECTION PERFORMED BY AN INTERNET OF THINGS DEVICE

(71) Applicant: QUALCOMM Incorporated, San Diego, CA (US)

(72) Inventors: Ralph Akram Gholmieh, San Diego, CA (US); Hamza Ijaz Abbasi, San Diego, CA (US); Elmira Mazloomian, San Diego, CA (US); Alan Soloway, Erie, CO (US)

(73) Assignee: QUALCOMM Incorporated, San Diego, CA (US)

(*) Notice: Subject to any disclaimer, the term of this patent is extended or adjusted under 35 U.S.C. 154(b) by 96 days.

(21) Appl. No.: 16/671,147

(22) Filed: Oct. 31, 2019

(65) Prior Publication Data

US 2021/0136651 A1   May 6, 2021

(51) Int. Cl.
*H04W 4/00* (2018.01)
*H04W 40/02* (2009.01)
*H04W 4/70* (2018.01)
*H04W 88/06* (2009.01)
*H04W 80/12* (2009.01)

(52) U.S. Cl.
CPC ............ *H04W 40/02* (2013.01); *H04W 4/70* (2018.02); *H04W 80/12* (2013.01); *H04W 88/06* (2013.01)

(58) Field of Classification Search
CPC ....... H04W 40/02; H04W 4/70; H04W 88/06; H04W 80/12
USPC ................................... 370/329; 455/312–314
See application file for complete search history.

(56) References Cited

U.S. PATENT DOCUMENTS

| | | |
|---|---|---|
| 2018/0359621 A1 | 12/2018 | Singhal et al. |
| 2019/0132196 A1 | 5/2019 | Trivedi et al. |
| 2020/0169890 A1* | 5/2020 | Kaushik ............. H04L 63/0876 |

* cited by examiner

*Primary Examiner* — Marcos Batista
(74) *Attorney, Agent, or Firm* — The Marbury Law Group, PLLC

(57) ABSTRACT

Various aspects enable communication link selection performed by a processor of an Internet of Things (IoT) device. The IoT device may identify one or more communication link characteristic preferences of the IoT device. The IoT device may scan characteristics of a plurality of connectivity objects that are linked in a server object. The IoT device may determine a best match access point name based on the communication link characteristic preferences of the IoT device and the scanned characteristics of the plurality of linked connectivity objects. The IoT device may select a communication link based on the determined best match access point name.

55 Claims, 12 Drawing Sheets

Object definition

| Name | Object ID | Instances | Mandatory | Object URN |
|------|-----------|-----------|-----------|------------|
| Bearer selection | 13 | Single | Optional | urn:oma:lwm2m:oma:13 |

Resource definitions

| ID | Name | Operations | Instances | Mandatory | Type | Range | Units | Description |
|----|------|------------|-----------|-----------|------|-------|-------|-------------|
| 0 | Preferred Communications Bearer | RW | Multiple | Optional | Integer | 8-bit | | Used in network selection and, if applicable, in subsequent mobility management procedures: 0: auto connect 1: 3GPP PS preferred 2: 3GPP PS GSM (GPRS) preferred (including EC-GSM-IoT) 3: 3GPP PS UMTS preferred 4: 3GPP PS LTE preferred 5: 1xEV-DO preferred (1) 6: 3GPP CS preferred (1) 7: WLAN preferred 8: Ethernet preferred (1) 9: DSL preferred (1) 10: Bluetooth preferred (1) 11: WiMAX preferred (1) 12: 3GPP PS LTE with CIoT EPS optimisations, User Plane preferred (2) 13: 3GPP PS LTE with CIoT EPS optimisations, Control Plane preferred (2) 14: 3GPP PS NB-IoT Control Plane optimisations preferred (2) 15: 3GPP PS NB-IoT User Plane optimisations preferred (2) 16-100: Reserved for future use The Preferred Communications Bearer resource specifies the preferred |

COMMUNICATION LINK SELECTION PERFORMED BY AN INTERNET OF THINGS DEVICE

BACKGROUND

In the Lightweight Machine-to-Machine (LwM2M) protocol, such as the LwM2M protocol defined according to the Open Mobile Alliance (OMA) LwM2M version 1.1 specification, the LwM2M object design is limited. According to the LwM2M object design, a single connectivity object instance link may be specified per server object. For example, a server object may link only to a single connectivity object, and the single connectivity object may only specify one Access Point Name (APN). Further, within a connectivity object, a single APN and a single set of network indicators, such as Public Land Mobile Networks (PLMN), may be specified, and a radio access technology (RAT) type cannot be specified for an APN.

SUMMARY

Various aspects enable methods of communication link selection performed by a processor of an Internet of Things (IoT) device. Various aspects may include identifying one or more communication link characteristic preferences of the IoT device, scanning characteristics of a plurality of connectivity objects that are linked in a server object, determining a best match access point name based on the communication link characteristic preferences of the IoT device and the scanned characteristics of the plurality of linked connectivity objects, and selecting a communication link based on the determined name. In some aspects, identifying one or more communication link characteristic preferences of the IoT device may include determining a listing order of communication link characteristics of one or more of the connectivity objects.

Some aspects may further include determining an identity of a network with which the IoT device is in communication, in which scanning characteristics of a plurality of connectivity objects that are linked in a server object may include scanning the characteristics of the plurality of connectivity objects that are linked in the server object based on the determined network identity. In some aspects, the plurality of connectivity objects may include Object 11 instances at a LwM2M client. In some aspects, identifying one or more communication link characteristic preferences of the IoT device may include identifying a preferred radio access technology (RAT), and scanning characteristics of a plurality of connectivity objects that are linked in a server object may include scanning the plurality of characteristics of connectivity objects that are linked in the server object based on the preferred RAT. In some aspects, scanning the characteristics of the plurality of connectivity objects that are linked in the server object based on the preferred RAT may include scanning a multi-instance radio access technology resource of the connectivity objects.

In some aspects, identifying one or more communication link characteristic preferences of the IoT device may include identifying a preferred packet data network type, and scanning characteristics of a plurality of connectivity objects that are linked in a server object may include scanning the characteristics of the plurality of connectivity objects that are linked in the server object based on the preferred packet data network type.

Some aspects may further include determining whether one or more of the connectivity objects includes a RAT priority indication, and raising a priority of a RAT corresponding to the RAT priority indication in response to determining that one or more of the connectivity objects includes a RAT priority indication, in which determining a best match access point name based on the communication link characteristic preferences of the IoT device and the scanned characteristics of the plurality of linked connectivity objects may include determining the best match access point name based on the RAT priority indication included in the one or more connectivity objects.

Some aspects may further include determining whether a RAT type of one or more of the connectivity objects matches a current RAT of the IoT device in response to determining that one or more of the connectivity objects does not include the RAT priority indication, and raising a priority of the RAT type of a non-current RAT of the IoT device in response to determining that no RAT type of the one or more connectivity objects matches the current RAT of the IoT device. In some aspects, determining a best match access point name based on the communication link characteristic preferences of the IoT device and the scanned characteristics of the plurality of linked connectivity objects may include determining the best match access point name based on the current RAT of the IoT device in response to determining that the RAT type of one or more of the connectivity objects matches the current RAT of the IoT device. Some aspects may further include determining that the RAT priority indication of one or more of the connectivity objects has increased, and determining whether a RAT associated with the increased RAT priority indication of the one or more of the connectivity objects matches a current RAT of the cell to which the IoT device is connected, in which determining the best match access point name based on the RAT priority indication included in the one or more connectivity objects may include determining the best match access point name based on the RAT associated with the increased RAT priority indication of the one or more of the connectivity objects in response to determining that the RAT associated with the increased RAT priority indication of the one or more of the connectivity objects matches the current RAT of the cell to which the IoT device is connected. Some aspects may further include instructing a modem of the IoT device to increase a priority of the RAT associated with the increased RAT priority indication in response to determining that the RAT associated with the increased RAT priority indication of the one or more of the connectivity objects does not match the current RAT of the IoT device, determining whether the modem has changed to the RAT associated with the increased RAT priority indication, and determining the best match access point name in response to determining that the modem has changed to the RAT associated with the increased RAT priority indication. Some aspects may further include initializing a timer, determining whether one or more of the connectivity objects indicate a RAT, with or without a priority indication, that matches the current RAT of the cell to which the IoT device is connected in response to determining that the timer has elapsed, and determining the best match access point name in response to determining that one or more of the connectivity objects indicate a RAT that matches the current RAT of the cell to which the IoT device is connected.

In some aspects, the plurality of connectivity objects may include an Object 13 instance. In some aspects, the Object 13 instance may include a preferred RAT. In some aspects, the Object 13 instance may include a RAT priority indication. In some aspects, the Object 11 instance includes a link to one Object 13 instances. In some aspects, the server object includes a preferred bearer resource indication.

Further aspects include an IoT device having a processor configured with processor-executable instructions to perform operations of any of the methods summarized above. Various aspects include an IoT device having means for performing functions of any of the methods summarized above. Various aspects include a non-transitory processor-readable medium having stored thereon processor-executable instructions configured to cause a processor of an IoT device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 4C is a chart illustrating an example of object and resource definitions for connectivity objects for use in a method communication link selection by an IoT device according to various embodiments.

DETAILED DESCRIPTION

Figure 1:
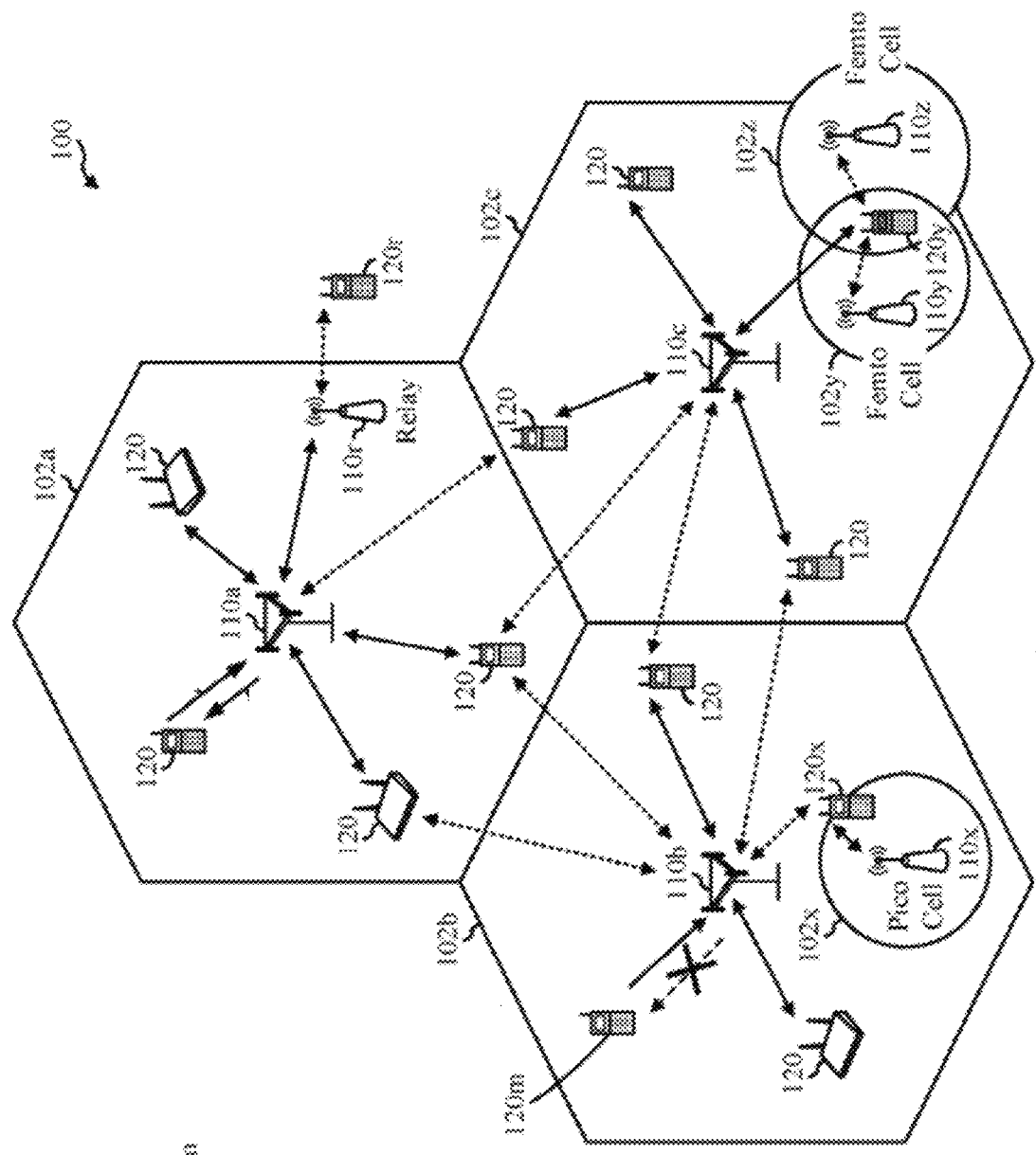
FIG. 1 is a system block diagram conceptually illustrating an example telecommunications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices.

Various embodiments may be implemented in any device, system or network that is capable of transmitting and receiving RF signals according to any of the Institute of Electrical and Electronics Engineers (IEEE)16.11 standards, or any of the IEEE 802.11 standards, the Bluetooth standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G, or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

The term "multicore processor" is used herein to refer to a single integrated circuit (IC) chip or chip package that contains two or more independent processing cores (e.g., central processing unit (CPU) core, internet protocol (IP) core, graphics processor unit (GPU) core, etc.) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As noted above, the LwM2M protocol limits the object design so that only single connectivity object instance link may be specified per server object, and the single connectivity object may only specify one APN. This limits the ability of IoT devices to handle multiple APNs, as may be needed to accommodate different radio access technologies (RAT). This can particularly be limited when a wireless service provider supports multiple RATs for communications with IoT devices, such as the LTE Category M protocol (Cat. M) and the Narrowband-Internet of Thing (NB-IoT) protocol, when each radio protocol is assigned a different APN.

Various embodiments enable communication link selection by IoT devices using the LwM2M protocol by enabling access to multiple APN, such as necessary to access and use different IoT communication protocols. Various embodiments provide system information and components to enable an IoT device to evaluate various characteristics of available communication links to select and access an appropriate communication link for communication by the IoT device.

In various embodiments, an array of APN links may be provided within server objects and connectivity objects. The IoT device may identify one or more communication link characteristic preferences of the IoT device. Multi-instance RAT resources may be identified in one or more connectivity objects, which may include an APN name and identify an associated PLMN, RAT and PDN type, as well as indicate whether the associated RAT has priority. For example, one connectivity object may be provided that identifies the APN name for the Cat-M1 RAT, as well as the associated PDN type (e.g., IPV4) and indicate that the Cat-M1 RAT has priority, and another connectivity object may be provided that identifies the APN name for the NB-IoT RAT, as well as the associated PDN type (e.g., NIDD) and indicate that the NB-IoT RAT does not have priority. The IoT device may scan characteristics of a plurality of connectivity objects that are linked in a server object. Based on this scan, the IoT device may determine a best match access point name based on the communication link characteristic preferences of the IoT device and the scan characteristics of the plurality of link connectivity objects. The IoT device may then select and implement a communication link based on the determined best match access point name.

In some embodiments, the IoT device may determine an identity of the network (e.g., a PLMN or another suitable network) with which the IoT device is in communication. In some embodiments, the IoT device may scan the characteristics of the plurality of connectivity objects that are linked in the server object based on the determined network identity, which may enable the IoT device to identify APNs that apply (e.g., are available, present, or detectable) in the current PLMN. In some embodiments, the IoT device may determine a PLMN priority based on an order of listing (or alternatively of an explicitly specified priority) of PLMNs in the connectivity objects; the IoT device may then connect to the higher priority PLMN if multiple PLMN options exist. In some embodiments, the IoT device may use a default connectivity object that is not associated with any PLMN if the existing connectivity objects that are associated with specific PLMNs do not match available PLMNs. In some embodiments, the plurality of connectivity objects may include instances of Object 11.

In some embodiments, the IoT device may identify a preferred RAT (e.g., Cat.-M1) and scan the plurality of characteristics of the linked connectivity objects based on the preferred RAT. In some embodiments, the IoT device may scan a multi-instance RAT resource of the connectivity objects. In some embodiments, the IoT device may identify a preferred PDN type, and the IoT device may scan the characteristics of the plurality of connectivity objects based on the preferred PDN type.

In some embodiments, the IoT device may determine whether one or more of the connectivity objects includes a RAT priority indication. In some embodiments, the IoT device may determine a best match access point based on the RAT priority indication in response to determining that one or more of the connectivity objects includes the RAT priority indication. In some embodiments, the IoT device may determine whether a RAT type of one or more of the connectivity objects matches a current RAT of the IoT device in response to determining that one or more of the connectivity objects does not include the RAT priority indication. In such embodiments, the IoT device may raise a priority of the RAT type of the one or more of the connectivity objects in response to determining that the RAT type of one or more of the connectivity objects does not match the current RAT of the IoT device. In some embodiments, a modem processor of the IoT device (e.g., by itself, or as instructed by another processor) may raise the priority of the RAT type so that the IoT device modem processor may switch to the higher priority RAT. In some embodiments, the IoT device may determine the best match access point based on the current RAT of the IoT device in response to determining that the RAT type of one or more of the connectivity objects matches the current RAT of the IoT device.

In some embodiments, the IoT device may determine that the RAT priority has been increased in or by the IoT device modem processor. For example, to utilize the characteristics of a particular RAT, the IoT device may increase a priority of a particular RAT. In some embodiments, the IoT device may determine whether the RAT associated with the increased RAT priority indication matches a current RAT of the IoT device (i.e., matches a RAT of the cell with which of the IoT device is currently communication). In response to determining that the RAT associated with the increased RAT priority indication matches a current RAT of the IoT device, the IoT device may determine a best match access point name based on the match of the current RAT and of the RAT associated with the increased RAT priority indication.

In response to determining that the RAT associated with the increased RAT priority indication does not match a current RAT of the IoT device, the IoT device modem may increase (or be instructed to increase by another processor) the priority of the RAT associated with the increased RAT priority indication.

In some embodiments, the IoT device may determine whether the modem has changed to the RAT associated with the increased RAT priority indication. In response to determining that the modem has changed to the RAT associated with the increased RAT priority indication, the IoT device may determine the best match access point name based on the modem changing to the RAT associated with the increased RAT priority indication.

In some embodiments, the IoT device may initialize a timer that may be configured to provide a waiting period or timeout period during which the processor may determine whether the modem changes to the RAT associated with the increased RAT priority indication. In some embodiments, in response to determining that the timer has elapsed, the IoT device may determine whether one or more connectivity objects indicate a RAT, with or without a priority indication, that matches the current RAT of the IoT device. In some embodiments, determining whether one or more connectivity objects indicate a RAT that matches the current RAT may include determining a default entry in a connectivity object.

In response to determining that one or more connectivity objects indicate a RAT that matches the current RAT of the IoT device, the IoT device may determine the best match access point name based on the indication of the current RAT.

In some embodiments, the plurality of connectivity objects may include an LwM2M Object 13 instance. In some embodiments, the connectivity objects may include a preferred RAT. In some embodiments, the connectivity objects may include a RAT priority indication. In some embodiments, an LwM2M Object 13 instance may include a link to one or more LwM2M Object 11 instances at a LwM2M client. In some embodiments, the server object may include a preferred bearer resource indication.

In some embodiments, to enable the IoT device to select from among multiple APNs, an array of APN links may be provided in a server object. In some embodiments, multi-instance RAT resources may be provided in one or more connectivity objects. In some embodiments, the IoT device may determine an identity of a PLMN with which it is in communication. In some embodiments, the IoT device may determine which resources correspond to the PLMN identity. In some embodiments, based on one or more of the PLMN identity, available APNs, a current RAT, a preferred RAT, a PDN type (e.g., IP, NIDD, etc.), and/or a RAT priority, the IoT device may select a best match APN.

For example, the IoT device may consider an identity of a PLMN on which it is currently camped, a currently-used RAT (e.g., Cat-M1 or ND-IoT), and a preferred binding type or PDN type (e.g., IP, NIDD, etc.), and the IoT device may scan one or more connectivity objects that are linked in the server object. In some embodiments, the IoT device may first try to match a connectivity object linked through an APN link, then may try to match a connectivity object linked through additional APNs, to determine entities that correspond to the PLMN, to identify an APN name to be used. In some embodiments, the IoT device may consider a prioritization of one or more characteristics. In some embodiments, the prioritization may be indicated by, for example, a flag indicating that a characteristic is prioritized. In some embodiments, the prioritization may be indicated by a priority within a range or a priority within multiple levels of possible prioritization.

In some embodiments, one or more instances of an LwM2M Object 11 may be configured to provide a prioritization of RATs. For example, LwM2M Object 11 may be configured to include a preferred RAT flag to indicate the RAT to use preferentially in the event that an APN corresponds to multiple RAT types. In some embodiments, the IoT device may determine a PLMN with which it is currently communication, a preferred PLMN, and a PDN type. The IoT device may obtain a sub-list of one or more connectivity object instances with different PDN types. One PDN type may be indicated as a default PDN type. The IoT device may determine a currently-used RAT and if a connectivity object instance includes a priority indication, the IoT device may raise the priority of the corresponding RAT. If no connectivity object instance includes a RAT priority indication, and no connectivity object instance includes a RAT type that matches the IoT device's current cell, the IoT device may raise the priority indication of another RAT type. The IoT device may select an APN corresponding to the connectivity object instance matching the current RAT. If the IoT device determines that a priority of another RAT (i.e., a RAT other than the currently-used RAT) has been raised, the IoT device may initialize a timer and wait for a timeout duration. If the device switches to a cell using a preferred RAT, the IoT device may select a communication link using an APN corresponding to the current, preferred, RAT. If the IoT device does not switch to a preferred RAT, the IoT device may determine whether a connectivity object instance includes the current RAT. If a connectivity object instance includes the current RAT, the IoT device may select a communication link using an APN corresponding to the current RAT. If no connectivity object includes the current RAT (for example, no connectivity object indicates a default configuration that applies to any RAT within the current RAT type and PLMN preferences), the IoT device may reinitialize the timer and continue to wait (e.g., for the timeout duration).

In some embodiments, the plurality of connectivity objects may include an Object 13 instance. For example, in some embodiments an LwM2M Object 13 may be configured to support multiple instances. In some embodiments, the Object 13 instance may include a RAT priority indication. In some embodiments, the Object 13 instance may include a link to one or more Object 11 instances at a LwM2M client. In other embodiments, the server object (object 1) may link to an instance of object 13 that would include a RAT preference specific to that object and that can override the default preference. In some embodiments, the server object may include a preferred bearer resource indication.

FIG. 1 illustrates an example wireless network 100, such as a new radio (NR) or 5G network, in which embodiments of the present disclosure may be performed. For example, an IoT device equipped with the system in a package (SIP) 200 illustrated in FIG. 2 may include a 5G modem processor that is configured to send and receive information via the wireless network 100.

In the example illustrated in FIG. 1, the wireless network 100 includes a number of base stations 110 and other network entities. A base station may be a station that communicates with wireless devices including IoT devices. Each base station 110 may provide communication coverage for a particular geographic area. In 3rd Generation Partnership Project (3GPP), the term "cell" can refer to a coverage area of a Node B and/or a Node B subsystem serving this coverage area, depending on the context in which the term is used. In new radio (NR) or Fifth Generation (5G) network systems, the term "cell" and eNB, Node B, 5G NB, access point (AP), NR base station, NR base station, or transmission and reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular RAT and may operate on one or more frequencies. A frequency may also be referred to as a carrier, a frequency channel, etc. Each frequency may support a single RAT in a given geographic area in order to avoid interference between wireless networks of different RATs. Wireless networks 100 supporting IoT device communications may use or support a number of different RATs, including for example, LTE/Cat. M, NB-IoT, Global System for Mobile Communications (GSM), and Voice over Long Term Evolution (VoLTE) RATs as well as other RATs (e.g., 5G). Wireless networks 100 may use a different APN for each different RAT.

A base station may provide communication coverage for a macro cell, a pico cell, a femto cell, and/or other types of cell. A macro cell may cover a relatively large geographic area (e.g., several kilometers in radius) and may allow unrestricted access by IoT devices with service subscription. A pico cell may cover a relatively small geographic area and may allow unrestricted access by IoT devices with service subscription. A femto cell may cover a relatively small geographic area (e.g., a home) and may allow restricted access by IoT devices having association with the femto cell (e.g., IoT devices in a Closed Subscriber Group (CSG), IoT devices for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base station for the femto cells 102y and 102z, respectively. A base station may support one or multiple (e.g., three) cells. Further, base stations may support communications on multiple networks using multiple RATs, such as Cat.-M1, NB-IoT, GSM, and VoLTE.

The wireless network 100 may also include relay stations. A relay station is a station that receives a transmission of data and/or other information from an upstream station (e.g., a base station or an IoT device) and sends a transmission of the data and/or other information to a downstream station (e.g., an IoT device or a base station). A relay station may also be a wireless device that relays transmissions for other wireless devices including IoT devices. In the example shown in FIG. 1, a relay station 110r may communicate with the base station 110a and an IoT device 120r in order to facilitate communication between the base station 110a and the IoT device 120r. A relay station may also be referred to as a relay base station, a relay, etc. Further, relay stations may support communications on multiple networks using multiple RATs, such as Cat.-M1, NB-IoT, GSM, and VoLTE.

The wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 Watts) whereas pico base station, femto base station, and relays may have a lower transmit power level (e.g., 1 Watt).

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operations.

A network controller 130 may be coupled to a set of base stations and provide coordination and control for these base stations. The network controller 130 may communicate with the base stations 110 via a backhaul. The base stations 110 may also communicate with one another, e.g., directly or indirectly via wireless or wireline backhaul.

The IoT devices 120 (e.g., 120x, 120y, etc.) may be dispersed throughout the wireless network 100, and each IoT device may be stationary or mobile. Some IoT devices may be considered evolved or machine-type communication (MTC) devices or evolved MTC (eMTC) devices. MTC and eMTC IoT devices include, for example, robots, drones, remote devices, sensors, meters, monitors, location tags, etc., that may communicate with a base station, another device (e.g., remote device), or some other entity. A wireless node may provide, for example, connectivity for, or to, a network (e.g., a wide area network such as Internet or a cellular network) via a wired or wireless communication link.

In FIG. 1, a solid line with double arrows indicates desired transmissions between an IoT device and a serving base station, which is a base station designated to serve the IoT device on the downlink and/or uplink. A dashed line with double arrows indicates interfering transmissions between the IoT device and a base station.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal full frame transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

A NR base station (e.g., eNB, 5G Node B, Node B, transmission reception point (TRP), access point (AP)) may correspond to one or multiple base stations. NR cells may be configured as access cell (ACells) or data only cells (DCells). For example, the radio access network (RAN) (e.g., a central unit or distributed unit) may configure the cells. DCells may be cells used for carrier aggregation or dual connectivity, but not used for initial access, cell selection/reselection, or handover. NR base stations may transmit downlink signals to IoT devices indicating the cell type. Based on the cell type indication, the IoT device may communicate with the NR base station. For example, the IoT device may determine NR base stations to consider for cell selection, access, handover (HO), and/or measurement based on the indicated cell type.

Figure 2:
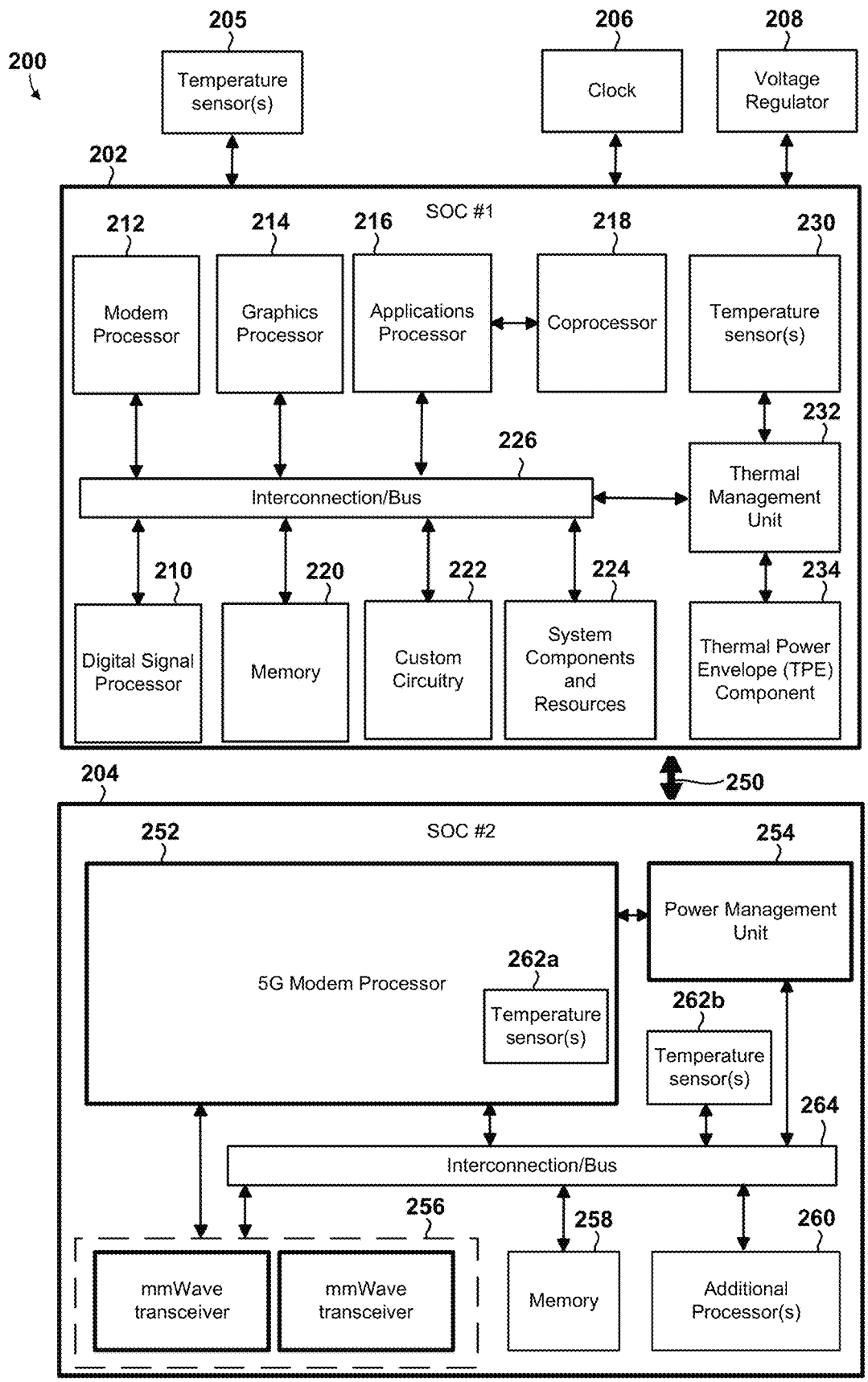
FIG. 2 is a component block diagram illustrating components of example IoT devices suitable for implementing various embodiments.

The various embodiments may be implemented on IoT devices equipped with any of a number of single processor and multiprocessor computer systems, including a system-on-chip (SOC) or system in a package (SIP). FIG. 2 illustrates an example computing system or SIP 200 architecture that may be used in IoT devices (e.g., the IoT devices 120) implementing the various embodiments. With reference to FIGS. 1 and 2, the SIP 200 may provide all of the processing, data storage and communication capabilities required to support the mission or functionality of a given IoT device. The same SIP 200 may be used in a variety of different types of IoT devices (e.g., smart meters, smart appliances, sensors, etc.) with device-specific functionality provided via programming of one or more processors within the SIP. Further, the SIP 200 is an example of components that may be implemented in a SIP used in IoT devices and more or fewer components may be included in a SIP used in IoT devices without departing from the scope of the claims.

The example SIP 200 illustrated in FIG. 2 includes two SOCs 202, 204, a temperature sensor 205, a clock 206, and a voltage regulator 208. In some embodiments, the first SOC 202 operates as central processing unit (CPU) of the IoT device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

In the example illustrated in FIG. 2, the first SOC 202 includes a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 includes a 5G modem processor 252, a power management unit 254, temperature sensors 262a 262b, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for perform other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on an IoT device. The system components and resources 224 and/or custom circuitry 222 may also include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processors 252, 260 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

Figure 3:
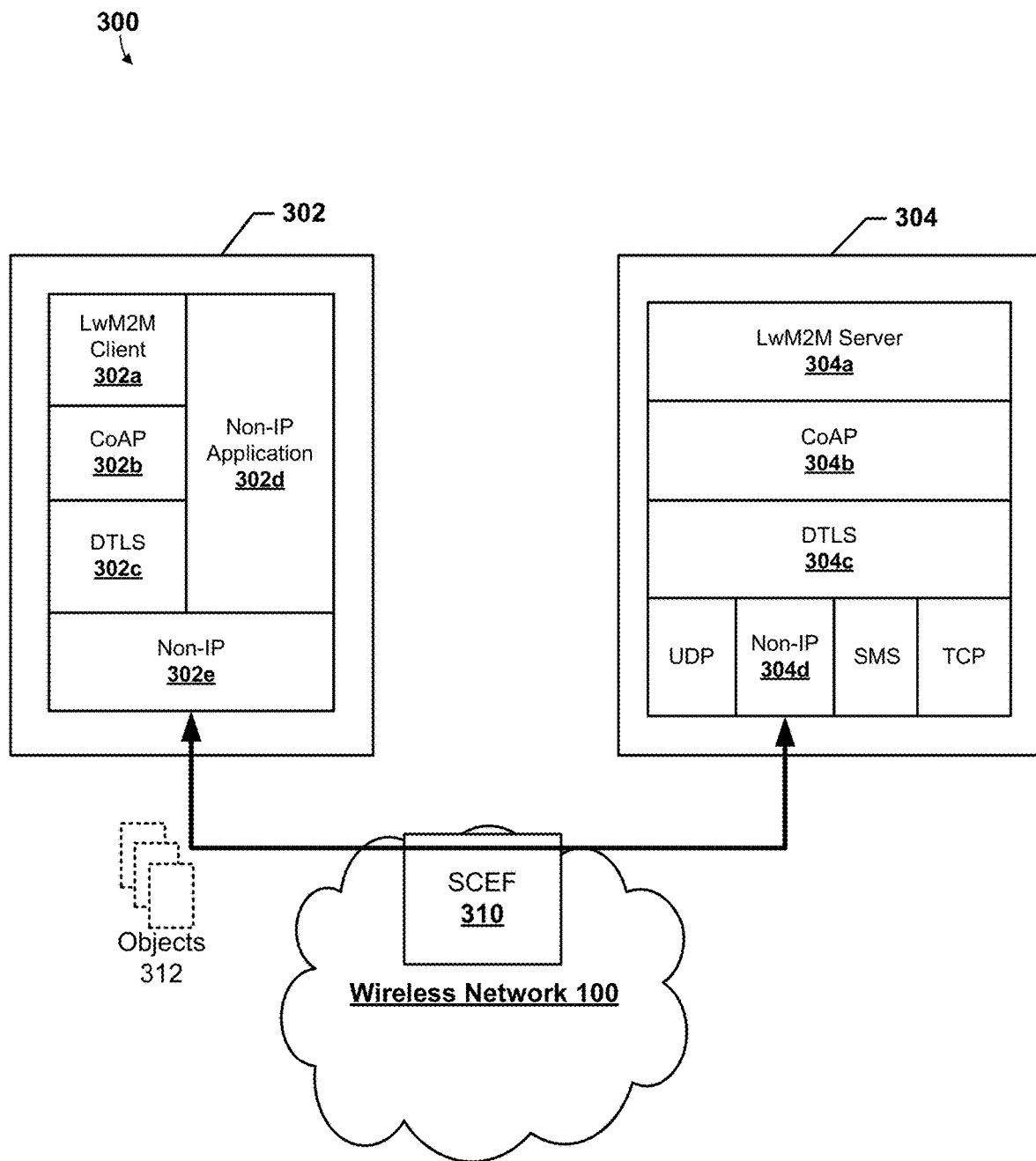
FIG. 3 is a block diagram illustrating an example NIDD data call architecture suitable for use with various embodiments.

FIG. 3 illustrates an example NIDD data call architecture 300 suitable for use with various embodiments. With reference to FIGS. 1-3, the architecture 300 shows an example of a NIDD data call between an IoT device 302 (e.g., IoT devices 120) and a server 304. The architecture 300 is discussed with reference to LwM2M, but LwM2M is merely an example of an application of a NIDD data call used to illustrate aspects of the architecture 300. Other protocols, such as other OMA protocols may be used to establish a NIDD data call and the architecture 300 may apply to non-LwM2M NIDD data calls. The IoT device 302 and the server 304 may be configured to communicate using NIDD. As an example, the IoT device 302 may be a LwM2M client device. As an example, the server 304 may be a LwM2M server, such as a bootstrap server as defined by LwM2M or an LwM2M server that is not a bootstrap server. The server 304 may be an application server.

A Service Capability Exposure Function (SCEF) 310 enables NIDD communication between the IoT device 302 and the server 304. The SCEF 310 enables devices such as the IoT device 302 and the application server 304 to access certain communication services and capabilities, including NIDD. The SCEF 310 may support RDD. While illustrated as in communication with one server 304, the SCEF 310 may route traffic to multiple servers each identified by their own respective destination port when using the RDS (Reliable Data Service) protocol. In this manner, a single NIDD data call through the SCEF 310 may include multiplexed traffic intended for multiple different destinations.

In some embodiments, the IoT device 302 may be configured with an LwM2M client 302*a* that uses the LwM2M device management protocol. The LwM2M device management protocol defines an extensible resource and data model. The LwM2M client 302*a* may employ a service-layer transfer protocol such as Constrained Application Protocol (CoAP) 302*b* to enable, among other things reliable and low overhead transfer of data. The IoT device 302 may employ a communication security protocol such as Datagram Transport Layer Security (DTLS) 302*c*. DTLS in particular may provide security for datagram-based applications. One such application may be a Non-IP Application 302*d*. The Non-IP Application 302*d* may utilize a non-IP protocol 302*e* to structure non-IP communications.

In some embodiments, the server 304 may be configured with an LwM2M server 304*a*, a transfer protocol such as CoAP 304*b*, and a security protocol such as DTLS 304*c*. The application server 304 may be configured to utilize a variety of communication protocols, such as non-IP protocol 304*d*, as well as other communication protocol such as UDP, SMS, TCP, and the like.

As an example, the IoT device 302 may be a constrained device having a very small power storage device and may be configured for an operational life of years. Typical protocols for establishing IP data bearers are notoriously power hungry. In contrast, NIDD may enable the IoT device 302 to communicate small amounts of data by a control plane, rather than a user plane, without the use of an IP stack. NIDD may have particular application in Cat.-M1, NB-IoT and CIoT communications to enable constrained devices to communicate via a cellular network and send or receive small amounts of data per communication (e.g., in some cases, on the order of hundreds of bytes, tens of bytes, or smaller). NIDD may enable the IoT device 302 to embed a small amount of data in a container or object 312 without use of an IP stack, and to send the container or object 312 to the server 304 via the SCEF 310. Similarly, the IoT device 302 may receive containers or objects 312 that define services and capabilities of the network 100 the IoT device 302 may be connected to enable the IoT device 302 to reach the SCEF 310 and server 304. For example, such containers or objects 312 that define services and capabilities may include various OMA objects, such as an APN connection profile object (Object ID 11), a LwM2M server object (Object ID 1), a LwM2M security object (Object ID 0), etc.

In some embodiments, the IoT device 302 may support RDS in a NIDD data call. The IoT device 302 may multiplex uplink traffic for different servers 304 by sending the uplink traffic with a pair of source and destination port numbers and an EPS bearer ID. The SCEF 310 may receive uplink traffic from the IoT device 302 and may route the uplink traffic to the appropriate server, such as server 304 or any other server, based on the destination port number indicated for the uplink traffic.

Figure 4A:
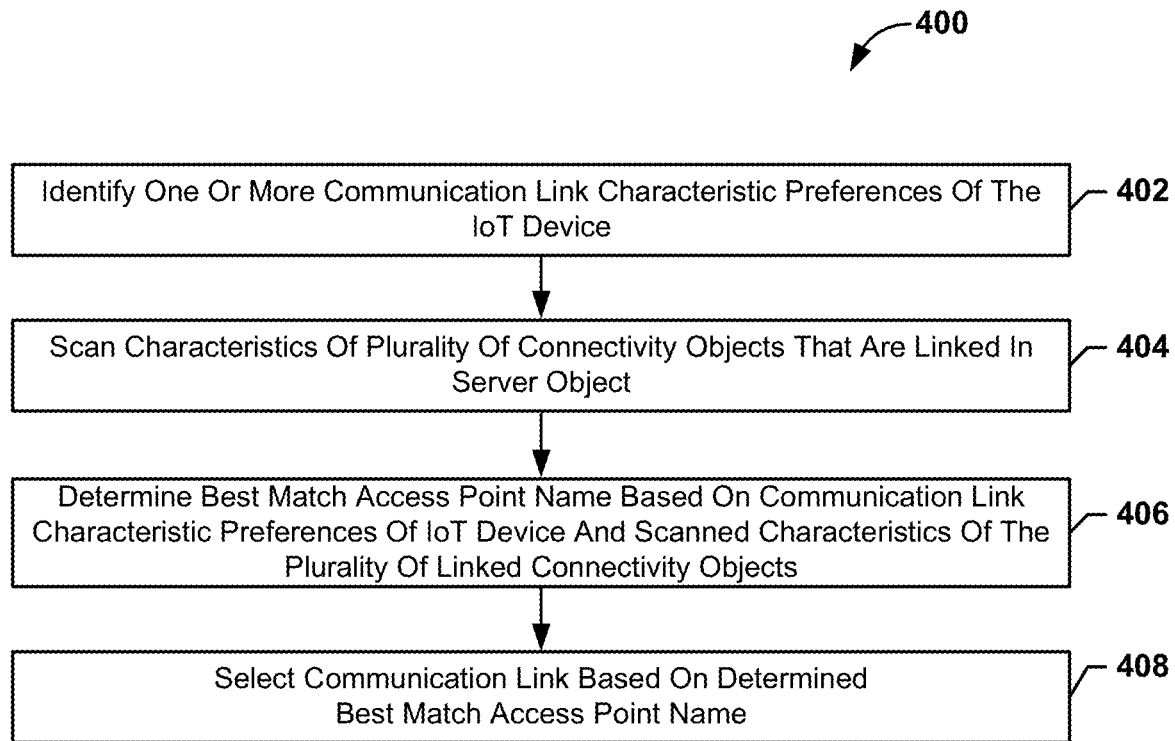
FIG. 4A is a process flow diagram illustrating a method for communication link selection by an IoT device according to various embodiments.
Figure 4B:
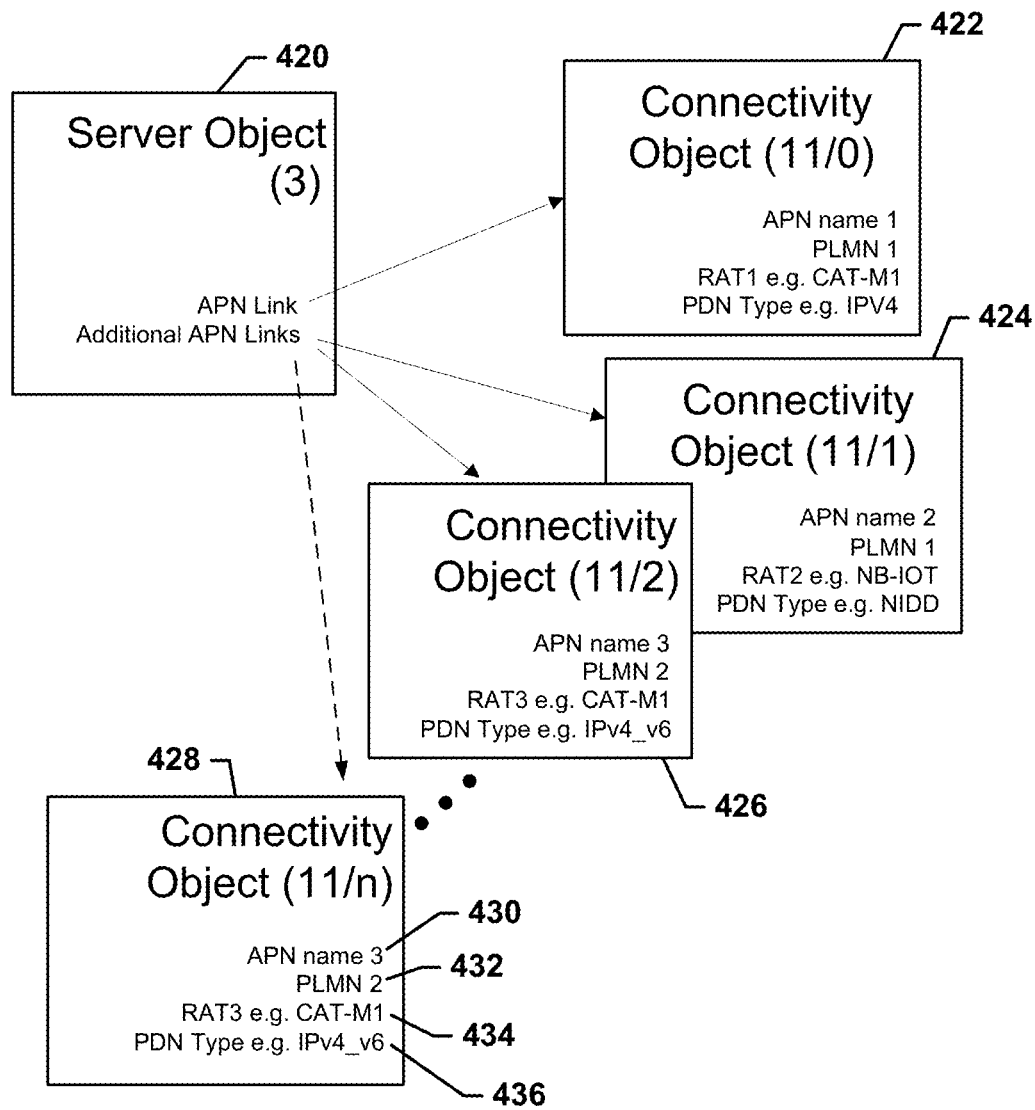
FIG. 4B is a data structure block diagram illustrating information elements and interrelations of connectivity objects for use in a method communication link selection by an IoT device according to various embodiments.

FIG. 4A is a process flow diagram, FIG. 4B illustrates a component block diagram, and FIG. 4C is a chart illustrating, illustrating a method 400 and aspects of components used in the method 400 according to some embodiments. With reference to FIGS. 1-4C, the method 400 may be implemented in hardware components and/or software components of an IoT device (e.g., the IoT devices 120) the operation of which may be controlled by one or more processors (e.g., the processors 212, 216, 252 or 260).

In block 402, the processor may identify one or more communication link characteristic preferences of the IoT device. For example, the processor may identify a network identifier of the network with which the IoT device is currently connected (such as a PLMN), a current RAT, a preferred network binding type (e.g., IP or NIDD), or another suitable preference. In some embodiments, the server object may include a preferred bearer resource indication. In some embodiments, identifying one or more communication link characteristic preferences of the IoT device may include determining a listing order of communication link characteristics of one or more of the connectivity objects.

In block 404, the processor may scan characteristics of a plurality of connectivity objects that are linked in a server object. For example, referring to FIG. 4B, a server object 420 may include a plurality of links to connectivity objects, such as the connectivity objects 422, 424, 426, and 428.

In some embodiments, the connectivity objects may include instances of Object 11. In some embodiments, the server object links may include APN links. In some embodiments, the characteristics of the connectivity objects may include an APN name 430, a PLMN identifier 432, a RAT identifier 434, a PDN type 436, and other suitable characteristics.

Referring to FIG. 4C, in some embodiments, the connectivity objects may include one or more instances of Object 13. In some embodiments, the Object 13 instance(s) may include preference and/or priority information 440, such as the example information in the Description column illustrated in FIG. 4C. In some embodiments, the Object 13 may include information indicating a preferred RAT. In some embodiments, the Object 13 may include information indicating a RAT priority indication. In some embodiments, the Object 13 may include a link to one or more Object 11 instances at a LwM2M client. In other embodiments, the server object, Object 1, may include a link to an Object 13 instance.

In block 406, the processor may determine a best match access point name based on the communication link characteristic preferences of the IoT device and the scanned characteristics of the plurality of linked connectivity objects. For example, the processor may determine that one or more of the communication link characteristic preferences match one or more of the scanned characteristics of the linked connectivity objects. In some embodiments, the processor may determine the best match access point name based on a number of matches between the communication link characteristic preferences and the scan characteristics of the linked connectivity objects.

In block 408, the processor may select a communication link based on the determined best match access point.

FIGS. 5A-5E are process flow diagrams illustrating operations 500A-500E that may be performed as part of the method 400 for communication link selection by an IoT device. With reference to FIGS. 1-5E the operations 500A-500E may be implemented in hardware components and/or software components of an IoT device (e.g., the IoT devices 120) the operation of which may be controlled by one or more processors (e.g., the processors 212, 216, 252 or 260).

Figure 5A:
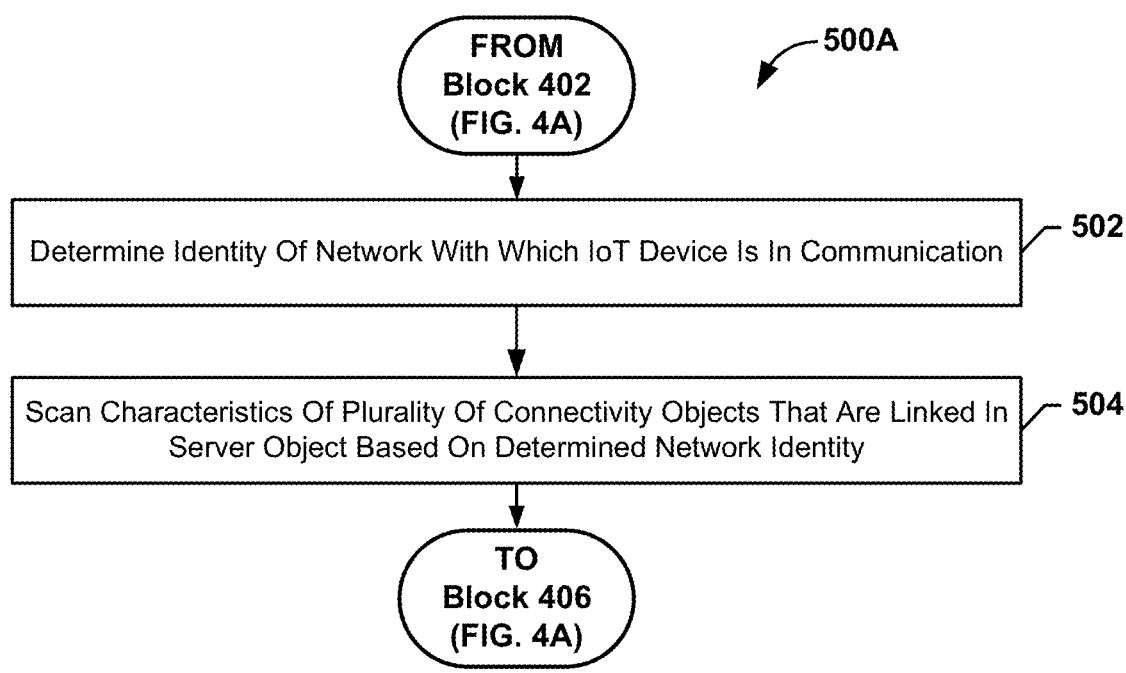
FIGS. 5A-5E are process flow diagrams illustrating additional or alternative operations that may be performed as part of the method for communication link selection by an IoT device according to some embodiments.

Referring to FIG. 5A, in some implementations following the operations of block 402 (FIG. 4A), the processor may determine an identity of a network with which the IoT devices and communication in block 502. For example, the processor may determine a PLMN identity or another suitable network identity.

In block 504, the processor may scan characteristics of the plurality of connectivity objects that are linked in the server object based on the determined network identity.

The processor may proceed to perform the operations of block 406 of the method 400 (FIG. 4A).

Figure 5B:
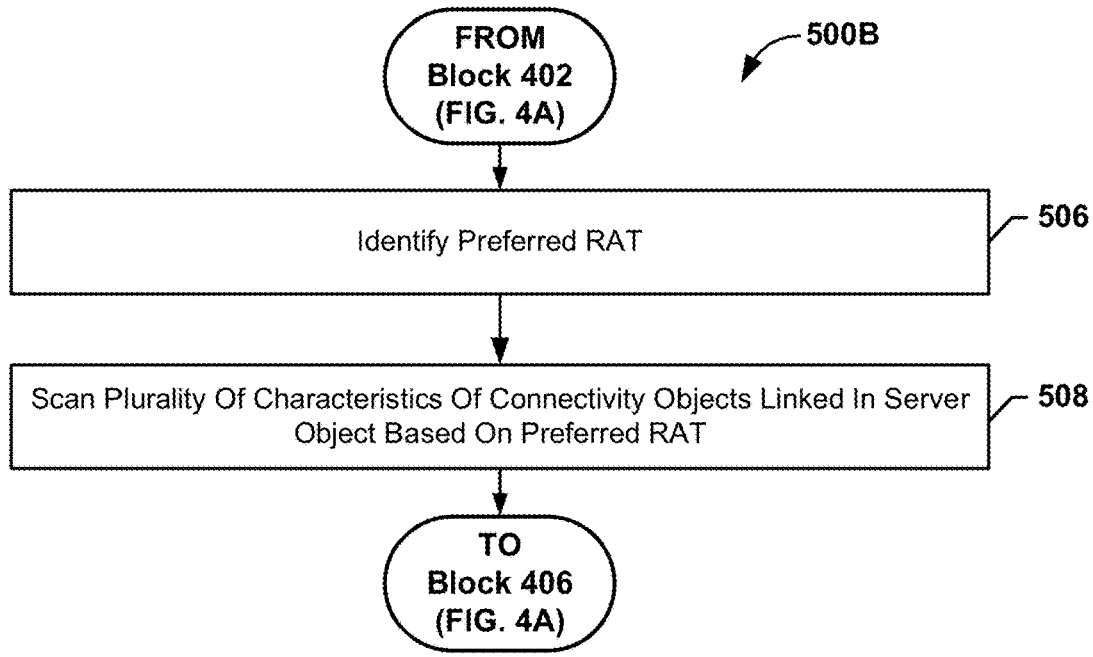

Referring to FIG. 5B, in some implementations following the operations of block 402 (FIG. 4A), the processor may identify a preferred RAT in block 506.

In block 508, the processor may scan the plurality of characteristics of connectivity objects that are linked in the server object based on the preferred RAT. In some embodiments, scanning the characteristics of the plurality of connectivity objects that are linked in the server object based on the preferred RAT may include scanning a multi-instance radio access technology resource of the connectivity objects.

The processor may proceed to perform the operations of block 406 of the method 400 (FIG. 4A).

Figure 5C:
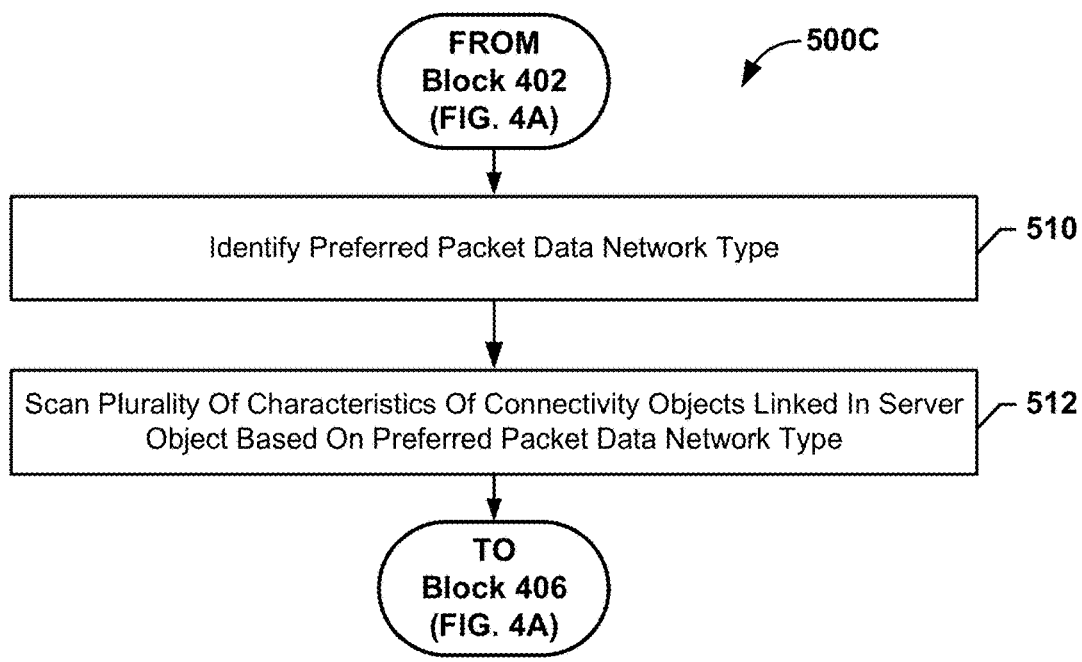

Referring to FIG. 5C, in some implementations following the operations of block 402 (FIG. 4A), the processor may identify a preferred packet data network (PDN) type in block 510.

In block 512, the processor may scan the characteristics of the plurality of connectivity objects that are linked in the server object based on the preferred PDN type.

The processor may proceed to perform the operations of block 406 of the method 400 (FIG. 4A).

Figure 5D:
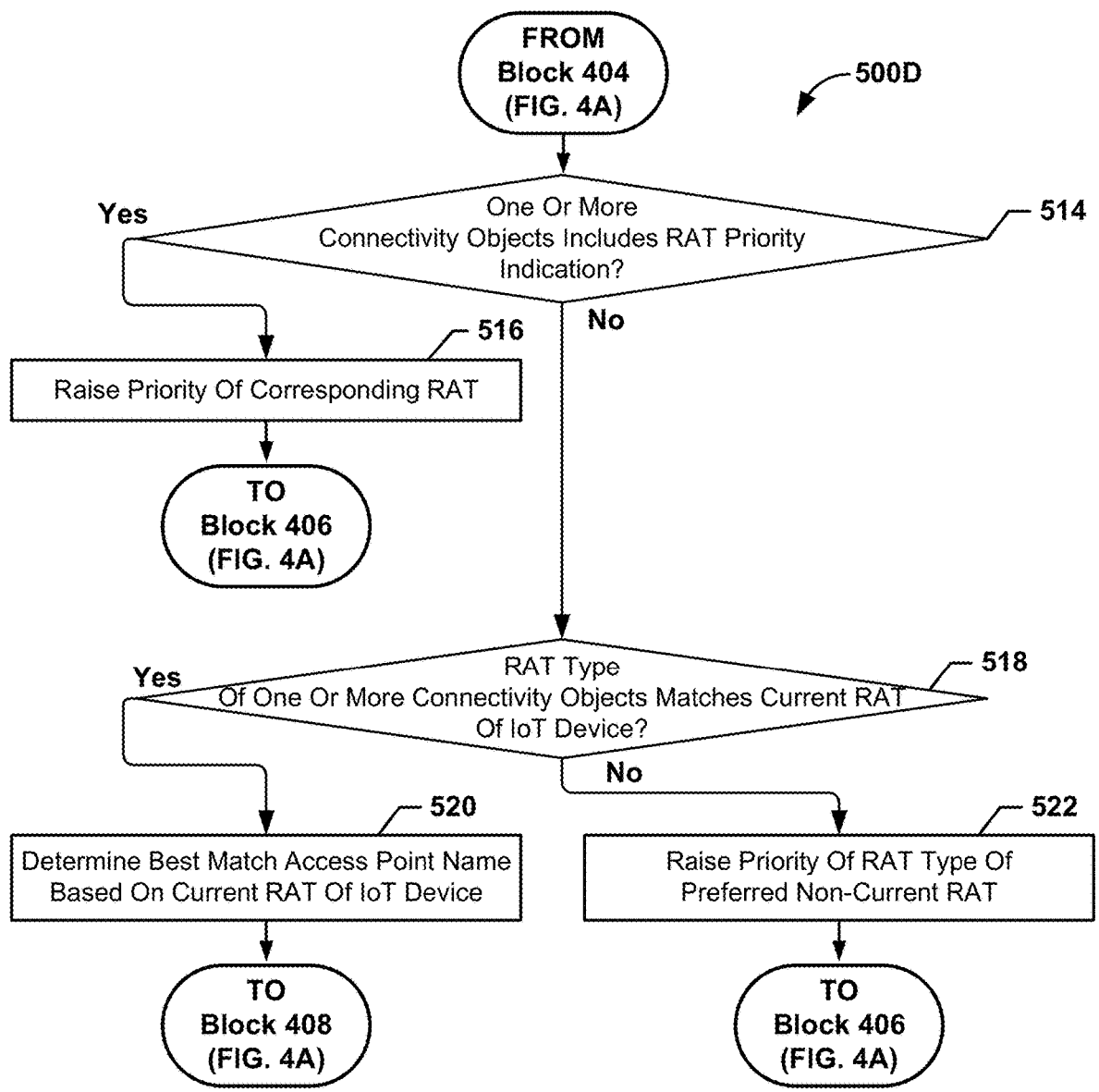

Referring to FIG. 5D, in some implementations following the operations of block 404 of the method 400 (FIG. 4A), the processor may determine whether one or more of the connectivity objects includes a RAT priority indication in determination block 514. In some embodiments, the RAT priority indication may include a flag or another suitable binary indication that a RAT is prioritized or not prioritized. In some embodiments, the RAT priority indication may include an indication of a priority that is in a range or levels of priority.

In response to determining that one or more of the connectivity objects includes the RAT priority indication (i.e., determination block 514="Yes"), the processor may raise the priority of a RAT corresponding to the RAT priority indication in block 516. In embodiments in which the RAT priority indication includes an indication of a priority that is in a range or levels of priority, the processor may change the priority of the corresponding RAT according to the relative priority indication within the range or levels of priority.

The processor may proceed to perform the operations of block 406 of the method 400 (FIG. 4A). In some embodiments, the processor may determine the best match access point name based on the RAT priority indication included in the one or more connectivity objects.

In response to determining that one or more of the connectivity objects do not provide a RAT priority indication (i.e., determination block 514="No"), the processor may determine whether a RAT type of one or more of the connectivity objects matches the current RAT of the IoT device in determination block 518.

In response to determining that the RAT type of one or more of the connectivity objects matches the current RAT of the IoT device (i.e., determination block 518="Yes"), the processor may determine a best match access point name based on the current RAT of the IoT device in block 520.

The processor may proceed to perform the operations of block 408 (FIG. 4A).

In response to determining that no RAT type of the one or more of the connectivity objects matches the current RAT of the IoT device (i.e., determination block 518="No"), the processor may raise a priority of the preferred non-current RAT in block 522.

The processor may proceed to perform the operations of block 406 of the method 400 (FIG. 4A). In some embodiments, the processor may determine the best match access point name based on the raised priority of the non-current RAT.

Figure 5E:
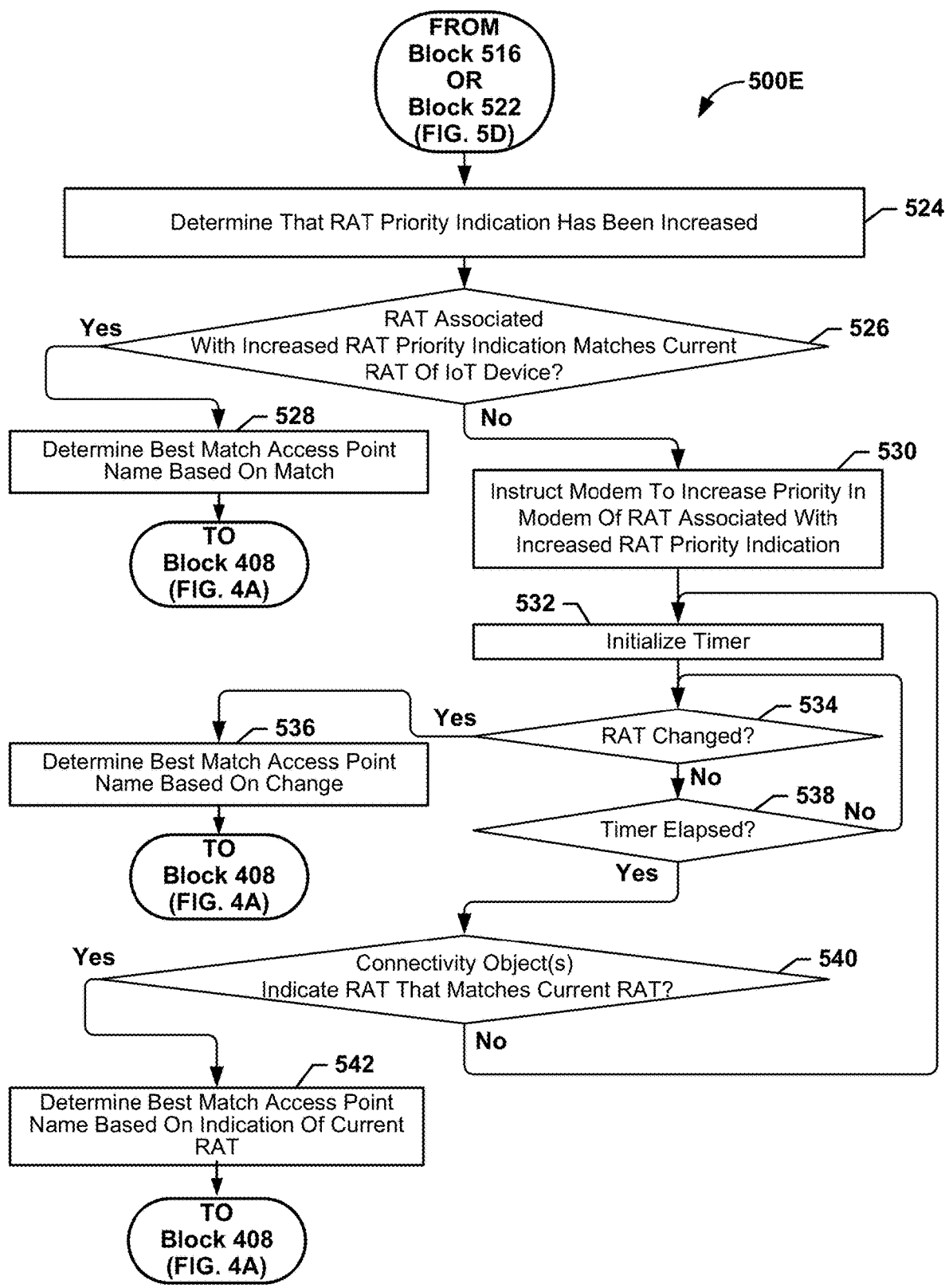

Referring to FIG. 5E, in some implementations following the operations of block 514 or block 522 (FIG. 5D), the processor may determine that a RAT priority indication of one or more of the connectivity objects has increased in block 524.

In determination block 526, the processor may determine whether a RAT associated with the increased RAT priority indication of the one or more of the connectivity objects matches a current RAT of the IoT device (i.e., a current RAT of the cell to which the IoT device is connected).

In response to determining that the RAT associated with the increased RAT priority indication of the one or more of the connectivity objects matches a current RAT of the IoT device (i.e., determination block 526="Yes"), the processor may determine the best match access point name based on the RAT associated with the increased RAT priority indication of the one or more of the connectivity objects in block 528.

The processor may proceed to perform the operations of block 408 of the method 400 (FIG. 4A).

In response to determining that the RAT associated with the increased RAT priority indication of the one or more of the connectivity objects does not match a current RAT of the IoT device (i.e., determination block 526="No"), the processor may instruct a modem of the IoT device to increase the priority of the RAT associated with the increased RAT priority indication in block 530.

In block 532, the processor may initialize a timer (e.g., for a duration or time period). In some embodiments, the timer may be configured to provide a waiting period or timeout period during which the processor may determine whether the modem changes to the RAT associated with the increased RAT priority indication.

In determination block 534, the processor may determine whether the modem has changed to the RAT associated with the increased RAT priority indication.

In response to determining that the modem has changed to the RAT associated with the increased RAT priority indication (i.e., determination block 534="Yes"), the processor may determine the best match access point name based on the modem changing to the RAT associated with the increased RAT priority indication in block 536.

The processor may proceed to perform the operations of block 408 of the method 400 (FIG. 4A).

In response to determining that the modem has not changed to the RAT associated with the increased RAT priority indication (i.e., determination block 534="No"), the processor may determine whether the timer has elapsed in determination block 538.

In response to determining that the timer has not elapsed (i.e., determination block 538="No"), the processor may again perform the operations of determination block 534 as described.

In response to determining that the timer has elapsed (i.e., determination block 538="Yes"), the processor may determine whether one or more connectivity objects indicate a RAT, with or without a priority indication, that matches the current RAT of the IoT device in determination block 540. In some embodiments, determining whether one or more connectivity objects indicate a RAT that matches the current RAT may include determining a default entry in a connectivity object in determination block 540.

In response to determining that one or more connectivity objects indicate a RAT that matches the current RAT of the IoT device (i.e., determination block 540="Yes"), the processor may determine the best match access point name based on the indication of the current RAT in block 542.

In response to determining that one or more connectivity objects do not a RAT that matches the current RAT of the IoT device (i.e., determination block 532="No"), the processor may reinitialize the timer in block 532

Figure 6:
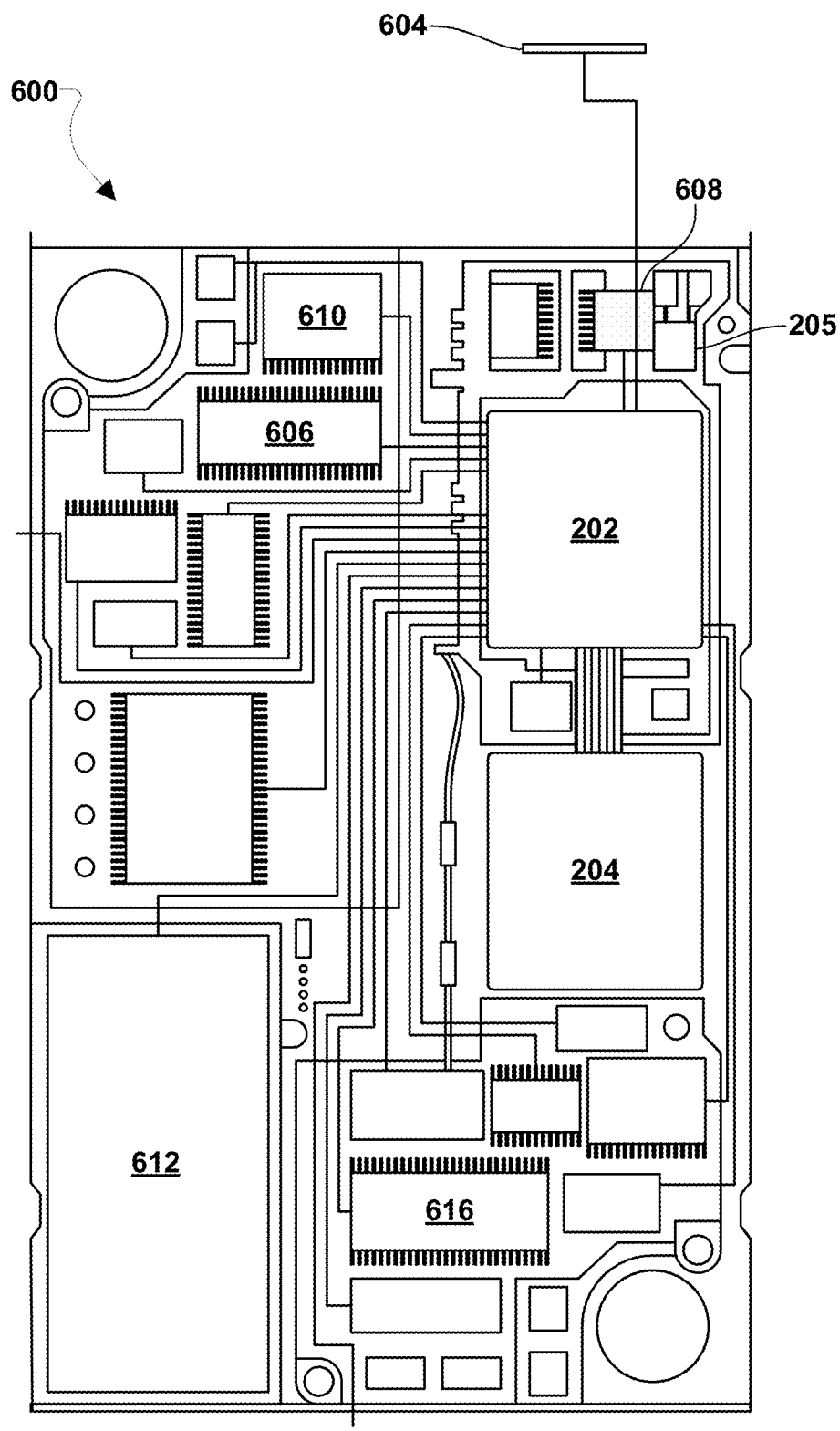
FIG. 6 is a component block diagram of an IoT device suitable for use in accordance with various embodiments.

The various embodiments may be implemented on a variety of IoT devices, an example in the form of a circuit board for use in a device is illustrated in FIG. 6. With reference to FIGS. 1-6, an IoT device 600 may include a first SOC 202 (e.g., a SOC-CPU) coupled to a second SOC 204 (e.g., a 5G capable SOC) and a temperature sensor 205. The first and second SOCs 202, 204 may be coupled to internal memory 606. Additionally, the IoT device 600 may include or be coupled to an antenna 604 for sending and receiving wireless signals from a cellular telephone transceiver 608 or within the second SOC 204. The antenna 604 and transceiver 608 and/or second SOC 204 may support communications using various RATs, including Cat.-M1, NB-IoT, CIoT, GSM, and/or VoLTE.

An IoT device 600 may also include a sound encoding/decoding (CODEC) circuit 610, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 608 and CODEC 610 may include a digital signal processor (DSP) circuit (not shown separately).

Some IoT devices may include an internal power source, such as a battery 612 configured to power the SOCs and transceiver(s). Such IoT devices may include power management components 616 to manage charging of the battery 612.

Figure 7:
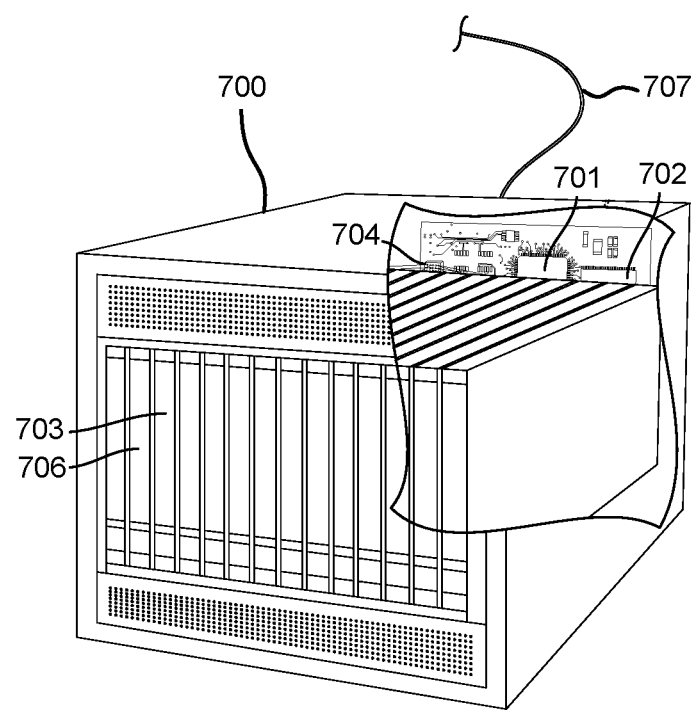
FIG. 7 is a component diagram of an example server suitable for use with the various embodiments

The various embodiments (including, but not limited to, embodiments discussed above with reference to FIGS. 1-18) may also be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or digital versatile disc (DVD) drive 706 coupled to the processor 701. The server 700 may also include one or more network transceivers 704, such as a network access port, coupled to the processor 701 for establishing network interface connections with a communication network 707, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

The processors used in any embodiments may be any programmable microprocessor, microcomputer or multiple processor chip or chips that can be configured by software instructions (applications) to perform a variety of functions, including the functions of the various embodiments described in this application. In some IoT devices, multiple processors may be provided, such as one processor dedicated to wireless communication functions (e.g., in SOC 204) and one processor dedicated to running other applications (e.g., in SOC 202). Typically, software applications may be stored in the internal memory 220, 258, 606, before they are accessed and loaded into a processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on an IoT device and the IoT device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (IDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for communication link selection performed by a processor of an Internet of Things (IoT) device, comprising:
   identifying one or more communication link characteristic preferences of the IoT device;
   scanning characteristics of a plurality of connectivity objects that are linked in a server object;
   determining a best match access point name based on the communication link characteristic preferences of the IoT device and the scanned characteristics of the plurality of linked connectivity objects; and
   selecting a communication link based on the determined name.

2. The method of claim 1, wherein identifying one or more communication link characteristic preferences of the IoT device comprises determining a listing order of communication link characteristics of one or more of the connectivity objects.

3. The method of claim 1, further comprising:
   determining an identity of a network with which the IoT device is in communication,
   wherein scanning characteristics of a plurality of connectivity objects that are linked in a server object comprises scanning the characteristics of the plurality of connectivity objects that are linked in the server object based on the determined network identity.

4. The method of claim 1, wherein the plurality of connectivity objects comprise Object 11 instances at a LwM2M client.

5. The method of claim 1, wherein:
   identifying one or more communication link characteristic preferences of the IoT device comprises identifying a preferred radio access technology (RAT); and
   scanning characteristics of a plurality of connectivity objects that are linked in a server object comprises scanning the plurality of characteristics of connectivity objects that are linked in the server object based on the preferred RAT.

6. The method of claim 5, wherein scanning the characteristics of the plurality of connectivity objects that are linked in the server object based on the preferred RAT comprises scanning a multi-instance radio access technology resource of the connectivity objects.

7. The method of claim 1, wherein:
identifying one or more communication link characteristic preferences of the IoT device comprises identifying a preferred packet data network type; and
scanning characteristics of a plurality of connectivity objects that are linked in a server object comprises scanning the characteristics of the plurality of connectivity objects that are linked in the server object based on the preferred packet data network type.

8. The method of claim 1, further comprising:
determining whether one or more of the connectivity objects includes a RAT priority indication; and
raising a priority of a RAT corresponding to the RAT priority indication in response to determining that one or more of the connectivity objects includes a RAT priority indication,
wherein determining a best match access point name based on the communication link characteristic preferences of the IoT device and the scanned characteristics of the plurality of linked connectivity objects comprises determining the best match access point name based on the RAT priority indication included in the one or more connectivity objects.

9. The method of claim 8, further comprising:
determining whether a RAT type of one or more of the connectivity objects matches a current RAT of the IoT device in response to determining that one or more of the connectivity objects does not include the RAT priority indication; and
raising a priority of the RAT type of a non-current RAT of the IoT device in response to determining that no RAT type of the one or more connectivity objects matches the current RAT of the IoT device.

10. The method of claim 9, wherein determining a best match access point name based on the communication link characteristic preferences of the IoT device and the scanned characteristics of the plurality of linked connectivity objects comprises:
determining the best match access point name based on the current RAT of the IoT device in response to determining that the RAT type of one or more of the connectivity objects matches the current RAT of the IoT device.

11. The method of claim 8, further comprising:
determining that the RAT priority indication of one or more of the connectivity objects has increased; and
determining whether a RAT associated with the increased RAT priority indication of the one or more of the connectivity objects matches a current RAT of the cell to which the IoT device is connected,
wherein determining the best match access point name based on the RAT priority indication included in the one or more connectivity objects comprises determining the best match access point name based on the RAT associated with the increased RAT priority indication of the one or more of the connectivity objects in response to determining that the RAT associated with the increased RAT priority indication of the one or more of the connectivity objects matches the current RAT of the cell to which the IoT device is connected.

12. The method of claim 11, further comprising:
instructing a modem of the IoT device to increase a priority of the RAT associated with the increased RAT priority indication in response to determining that the RAT associated with the increased RAT priority indication of the one or more of the connectivity objects does not match the current RAT of the IoT device;
determining whether the modem has changed to the RAT associated with the increased RAT priority indication; and
determining the best match access point name in response to determining that the modem has changed to the RAT associated with the increased RAT priority indication.

13. The method of claim 11, further comprising:
initializing a timer;
determining whether one or more of the connectivity objects indicate a RAT, with or without a priority indication, that matches the current RAT of the cell to which the IoT device is connected in response to determining that the timer has elapsed; and
determining the best match access point name in response to determining that one or more of the connectivity objects indicate a RAT that matches the current RAT of the cell to which the IoT device is connected.

14. The method of claim 1, wherein the plurality of connectivity objects comprise an Object 13 instance.

15. The method of claim 14, wherein the Object 13 instance comprises a preferred RAT.

16. The method of claim 14, wherein the Object 13 instance comprises a RAT priority indication.

17. The method of claim 14, wherein the Object 11 instance includes a link to one Object 13 instances.

18. The method of claim 14, wherein the server object includes a preferred bearer resource indication.

19. An Internet-of-Things (IoT) device, comprising:
a processor configured with processor-executable instructions to:
identify one or more communication link characteristic preferences of the IoT device;
scan characteristics of a plurality of connectivity objects that are linked in a server object;
determine a best match access point name based on the communication link characteristic preferences of the IoT device and the scanned characteristics of the plurality of linked connectivity objects; and
select a communication link based on the determined name.

20. The Internet-of-Things (IoT) device of claim 10, wherein processor is further configured with processor-executable instructions to identify one or more communication link characteristic preferences of the IoT device by determining a listing order of communication link characteristics of one or more of the connectivity objects.

21. The Internet-of-Things (IoT) device of claim 10, wherein the processor is further configured with processor-executable instructions to determine an identity of a network with which the IoT device is in communication,
wherein processor is further configured with processor-executable instructions to scan characteristics of a plurality of connectivity objects that are linked in a server object by scanning the characteristics of the plurality of connectivity objects that are linked in the server object based on the determined network identity.

22. The Internet-of-Things (IoT) device of claim 10, wherein the plurality of connectivity objects comprise Object 11 instances at a LwM2M client.

23. The Internet-of-Things (IoT) device of claim 10, wherein processor is further configured with processor-executable instructions to:
identify one or more communication link characteristic preferences of the IoT device by identifying a preferred radio access technology (RAT); and
scan characteristics of a plurality of connectivity objects that are linked in a server object by scanning the plurality of characteristics of connectivity objects that are linked in the server object based on the preferred RAT.

24. The Internet-of-Things (IoT) device of claim 23, wherein processor is further configured with processor-executable instructions to scan the characteristics of the plurality of connectivity objects that are linked in the server object based on the preferred RAT by scanning a multi-instance radio access technology resource of the connectivity objects.

25. The Internet-of-Things (IoT) device of claim 10, wherein processor is further configured with processor-executable instructions to:
identify one or more communication link characteristic preferences of the IoT device by identifying a preferred packet data network type; and
scan characteristics of a plurality of connectivity objects that are linked in a server object by scanning the characteristics of the plurality of connectivity objects that are linked in the server object based on the preferred packet data network type.

26. The Internet-of-Things (IoT) device of claim 10, wherein processor is further configured with processor-executable instructions to:
determine whether one or more of the connectivity objects includes a RAT priority indication; and
raise a priority of a RAT corresponding to the RAT priority indication in response to determining that one or more of the connectivity objects includes a RAT priority indication,
wherein processor is further configured with processor-executable instructions to determine a best match access point name based on the communication link characteristic preferences of the IoT device and the scanned characteristics of the plurality of linked connectivity objects by determining the best match access point name based on the RAT priority indication included in the one or more connectivity objects.

27. The Internet-of-Things (IoT) device of claim 26, wherein processor is further configured with processor-executable instructions to:
determine whether a RAT type of one or more of the connectivity objects matches a current RAT of the IoT device in response to determining that one or more of the connectivity objects does not include the RAT priority indication; and
raise a priority of the RAT type of a non-current RAT of the IoT device in response to determining that no RAT type of the one or more connectivity objects matches the current RAT of the IoT device.

28. The Internet-of-Things (IoT) device of claim 27, wherein processor is further configured with processor-executable instructions to determine a best match access point name based on the communication link characteristic preferences of the IoT device and the scanned characteristics of the plurality of linked connectivity objects by determining the best match access point name based on the current RAT of the IoT device in response to determining that the RAT type of one or more of the connectivity objects matches the current RAT of the IoT device.

29. The Internet-of-Things (IoT) device of claim 26, wherein processor is further configured with processor-executable instructions to:
determine that the RAT priority indication of one or more of the connectivity objects has increased; and
determine whether a RAT associated with the increased RAT priority indication of the one or more of the connectivity objects matches a current RAT of the cell to which the IoT device is connected,
wherein processor is further configured with processor-executable instructions to determine the best match access point name based on the RAT priority indication included in the one or more connectivity objects by determining the best match access point name based on the RAT associated with the increased RAT priority indication of the one or more of the connectivity objects in response to determining that the RAT associated with the increased RAT priority indication of the one or more of the connectivity objects matches the current RAT of the cell to which the IoT device is connected.

30. The Internet-of-Things (IoT) device of claim 29, wherein processor is further configured with processor-executable instructions to:
instruct a modem of the IoT device to increase a priority of the RAT associated with the increased RAT priority indication in response to determining that the RAT associated with the increased RAT priority indication of the one or more of the connectivity objects does not match the current RAT of the IoT device;
determine whether the modem has changed to the RAT associated with the increased RAT priority indication; and
determine the best match access point name in response to determining that the modem has changed to the RAT associated with the increased RAT priority indication.

31. The Internet-of-Things (IoT) device of claim 29, wherein processor is further configured with processor-executable instructions to:
initialize a timer;
determine whether one or more of the connectivity objects indicate a RAT, with or without a priority indication, that matches the current RAT of the cell to which the IoT device is connected in response to determining that the timer has elapsed; and
determine the best match access point name in response to determining that one or more of the connectivity objects indicate a RAT that matches the current RAT of the cell to which the IoT device is connected.

32. The Internet-of-Things (IoT) device of claim 10, wherein the plurality of connectivity objects comprise an Object 13 instance.

33. The Internet-of-Things (IoT) device of claim 32, wherein the Object 13 instance comprises a preferred RAT.

34. The Internet-of-Things (IoT) device of claim 32, wherein the Object 13 instance comprises a RAT priority indication.

35. The Internet-of-Things (IoT) device of claim 32, wherein the Object 11 instance includes a link to one Object 13 instances.

36. The Internet-of-Things (IoT) device of claim 32, wherein the server object includes a preferred bearer resource indication.

37. An Internet-of-Things (IoT) device, comprising:
means for identifying one or more communication link characteristic preferences of the IoT device;
means for scanning characteristics of a plurality of connectivity objects that are linked in a server object;
means for determining a best match access point name based on the communication link characteristic preferences of the IoT device and the scanned characteristics of the plurality of linked connectivity objects; and
means for selecting a communication link based on the determined name.

38. A non-transitory processor-readable storage medium having stored thereon processor-executable instructions configured to cause a processor of an Internet of Things (IoT) device to perform operations comprising:
   identifying one or more communication link characteristic preferences of the IoT device;
   scanning characteristics of a plurality of connectivity objects that are linked in a server object;
   determining a best match access point name based on the communication link characteristic preferences of the IoT device and the scanned characteristics of the plurality of linked connectivity objects; and
   selecting a communication link based on the determined name.

39. The non-transitory processor-readable storage medium of claim 38, wherein identifying one or more communication link characteristic preferences of the IoT device comprises determining a listing order of communication link characteristics of one or more of the connectivity objects.

40. The non-transitory processor-readable storage medium of claim 38, further comprising:
   determining an identity of a network with which the IoT device is in communication,
   wherein scanning characteristics of a plurality of connectivity objects that are linked in a server object comprises scanning the characteristics of the plurality of connectivity objects that are linked in the server object based on the determined network identity.

41. The non-transitory processor-readable storage medium of claim 38, wherein the plurality of connectivity objects comprise Object 11 instances at a LwM2M client.

42. The non-transitory processor-readable storage medium of claim 38, wherein:
   identifying one or more communication link characteristic preferences of the IoT device comprises identifying a preferred radio access technology (RAT); and
   scanning characteristics of a plurality of connectivity objects that are linked in a server object comprises scanning the plurality of characteristics of connectivity objects that are linked in the server object based on the preferred RAT.

43. The non-transitory processor-readable storage medium of claim 42, wherein scanning the characteristics of the plurality of connectivity objects that are linked in the server object based on the preferred RAT comprises scanning a multi-instance radio access technology resource of the connectivity objects.

44. The non-transitory processor-readable storage medium of claim 38, wherein:
   identifying one or more communication link characteristic preferences of the IoT device comprises identifying a preferred packet data network type; and
   scanning characteristics of a plurality of connectivity objects that are linked in a server object comprises scanning the characteristics of the plurality of connectivity objects that are linked in the server object based on the preferred packet data network type.

45. The non-transitory processor-readable storage medium of claim 38, further comprising:
   determining whether one or more of the connectivity objects includes a RAT priority indication; and
   raising a priority of a RAT corresponding to the RAT priority indication in response to determining that one or more of the connectivity objects includes a RAT priority indication,
   wherein determining a best match access point name based on the communication link characteristic preferences of the IoT device and the scanned characteristics of the plurality of linked connectivity objects comprises determining the best match access point name based on the RAT priority indication included in the one or more connectivity objects.

46. The non-transitory processor-readable storage medium of claim 45, further comprising:
   determining whether a RAT type of one or more of the connectivity objects matches a current RAT of the IoT device in response to determining that one or more of the connectivity objects does not include the RAT priority indication; and
   raising a priority of the RAT type of a non-current RAT of the IoT device in response to determining that no RAT type of the one or more connectivity objects matches the current RAT of the IoT device.

47. The non-transitory processor-readable storage medium of claim 46, wherein determining a best match access point name based on the communication link characteristic preferences of the IoT device and the scanned characteristics of the plurality of linked connectivity objects comprises:
   determining the best match access point name based on the current RAT of the IoT device in response to determining that the RAT type of one or more of the connectivity objects matches the current RAT of the IoT device.

48. The non-transitory processor-readable storage medium of claim 45, further comprising:
   determining that the RAT priority indication of one or more of the connectivity objects has increased;
   determining whether a RAT associated with the increased RAT priority indication of the one or more of the connectivity objects matches a current RAT of the cell to which the IoT device is connected,
   wherein determining the best match access point name based on the RAT priority indication included in the one or more connectivity objects comprises determining the best match access point name based on the RAT associated with the increased RAT priority indication of the one or more of the connectivity objects in response to determining that the RAT associated with the increased RAT priority indication of the one or more of the connectivity objects matches the current RAT of the cell to which the IoT device is connected.

49. The non-transitory processor-readable storage medium of claim 48, further comprising:
   instructing a modem of the IoT device to increase a priority of the RAT associated with the increased RAT priority indication in response to determining that the RAT associated with the increased RAT priority indication of the one of the connectivity objects does not match the current RAT of the IoT device;
   determining whether the modem has changed to the RAT associated with the increased RAT priority indication; and
   determining the best match access point name in response to determining that the modem has changed to the RAT associated with the increased RAT priority indication.

50. The non-transitory processor-readable storage medium of claim 48, further comprising:
   initializing a timer;
   determining whether one or more of the connectivity objects indicate a RAT, with or without a priority indication, that matches the current RAT of the cell to which the IoT device is connected in response to determining that the timer has elapsed; and determining the best match access point name in response to determining that one or more of the connectivity objects indicate a RAT that matches the current RAT of the cell to which the IoT device is connected.

51. The non-transitory processor-readable storage medium of claim 38, wherein the plurality of connectivity objects comprise an Object 13 instance.

52. The non-transitory processor-readable storage medium of claim 51, wherein the Object 13 instance comprises a preferred RAT.

53. The non-transitory processor-readable storage medium of claim 51, wherein the Object 13 instance comprises a RAT priority indication.

54. The non-transitory processor-readable storage medium of claim 51, wherein the Object 11 instance includes a link to one Object 13 instances.

55. The non-transitory processor-readable storage medium of claim 51, wherein the server object includes a preferred bearer resource indication.

* * * * *